ial phosphate, phosphorus-containing polyester

United States Patent Office 3,400,102
Patented Sept. 3, 1968

3,400,102
PROCESS FOR PREPARING A PHOSPHONATED POLYESTER RESIN
Ralph S. Ludington, Niagara Falls, N.Y., assignor to Hooker Chemical Corporation, Niagara Falls, N.Y., a corporation of New York
No Drawing. Filed Mar. 29, 1965, Ser. No. 443,656
10 Claims. (Cl. 260—75)

This invention relates to novel esters and a process for their manufacture. In such a process phosphite esters are reacted with the esters of alpha,beta-unsaturated acids.

It has been observed (G. Kamai and V. A. Kukhtin, Zhurnal Obshchei Khimii, volume 31, No. 5, pp. 1735–1736, 1961) that no appreciable reaction occurs between triethyl phosphite and methyl acrylate at temperatures up to 120 degrees centigrade. Thus, it would appear that dimethyl maleate and trimethyl phosphite would not be expected to yield tetramethyl phosphonosuccinate under the same conditions. When it was attempted to react equivalent proportions of dimethyl maleate and trimethyl phosphite by the slow addition of phosphite at about 80 degrees centigrade under nitrogen, no tetramethyl phosphonosuccinate could be isolated from the reaction mixture. Instead, a quantitative yield of dimethyl fumarate was recovered from the reaction mixture by simple filtration.

In accordance with this invention, there is provided a process for preparing phosphonates by reacting a saturated carboxylic acid and an ethylenically unsaturated carboxylic ester with a phosphite at an elevated temperature. Thereafter the resulting phosphonate is recovered. Novel phosphonate compounds such as dimethyl diallyl phosphonosuccinate and phosphorus-containing polyester compositions having improved fire retardant characteristics are thereby produced.

In practicing this invention it is desirable that the saturated carboxylic acid contain from one to about 18 carbon atoms and preferably from one to eight carbon atoms. Suitable saturated, i.e., free of ethylenic and acetylenic unsaturation, acids are exemplified by formic acid, acetic acid, propionic acid, benzoic acid, phenylacetic acid, toluic acid and isobutyric acid. The saturated acid is employed in at least a stoichiometric amount, 1 to 4 moles being suitable and preferably 1.1 to 3 moles of saturated carboxylic acid being employed for each mole of an unsaturated carboxylic ester.

The ethylenically unsaturated carboxylic ester is the esterification product of a hydroxyl-containing compound and an alpha-beta unsaturated acid such as acrylic acid, crotonic acid, isocrotonic acid, methacrylic acid, sorbic acid, maleic acid, fumaric acid, cinnamic acid or their anhydrides. The hydroxyl-containing compound may range from the simplicity of methanol to the complexity of a polyester resin or a polyester-polyether resin, such as the resins obtained by the esterification of ethylene glycol with maleic anhydride and phthalic anhydride. The hydroxyl-containing compound is preferably aliphatic or cycloaliphatic and preferably contains from 1 to 20 carbon atoms. When it is a polyester or polyester-polyether resin the hydroxyl-containing compound may also be the esterification product of other hydroxyl compounds containing 1 to 20 carbon atoms and 2 to 6 hydroxyl groups such as propylene glycol, sorbitol and pentaerythritol.

When the ethylenically unsaturated compound is a polyester or polyester-polyether resin the amount of phosphite reacted with the resin may be varied so as to produce phosphonated resins having a considerable amount to no ethylenic unsaturation. The resulting resins free of unsaturation are thermoplastic while the resins with remaining unsaturation may be thermoset by the use of a cross-linking agent such as a peroxide or azonitrile. The latter resins may also be copolymerized with a vinylenic comonomer such as styrene or chlorostyrene. Such comonomers may be employed in the usual amounts such as up to about 50 percent of the total monomer, although lesser amounts to adjust, viscosity prior to cross-linking, or specific gravity, etc., may be used. The thermoset compositions may be reinforced by the addition of fibers and flocks such as glass, asbestos or nylon.

The phosphorus compounds employed in the process of this invention are esters of trivalent phosphorus, referred to in the literature as phosphites, phosphonites and phosphinites, which for simplicity will be collectively referred to as phosphites and are of the structure $(RO)_xP(R')_y$, in which R and R' groups contain from one to twelve carbon atoms and each R and R' is independently selected from the group consisting of alkyl, alkylene, aralkyl and aryl, provided that at least one R is alkyl, aralkyl or alkylene, $x$ is a number from 1 to 3 and $y$ is a number from 0 to 2 and the sum of $x$ and $y$ is three. The foregoing substituents of R and R' may be halogenated, chlorine and bromine being preferred. Typical phosphites which are satisfactory in the process of this invention include trimethyl phosphite, triethyl phosphite, tris-$\beta$-chloroethyl phosphite, dibutyl methylphosphonite, diethyl vinylphosphonite, diethyl phenylphosphonite and ethyl dimethylphosphinite.

The process of this invention may be carried out over a wide variation of temperatures, however, it is desirable that the reaction be conducted at a temperature from about 20 degrees centigrade to about 110 degrees centigrade, and preferably from about 60 degrees centigrade to 100 degrees centigrade. The time and rate of reaction is guided by temperature considerations. Since the reaction is exothermic, the phosphite should be added to the reaction mixture at such a time and rate that the temperature is maintained within the aforementioned desirable limits. In the typical operation of the process of this invention the reaction is completed in a period of from about two to ten hours. Among the esters of saturated acids which may be formed and distilled off during this process are methyl formate, ethyl formate, methyl acetate, isopropyl formate, ethyl acetate, methyl propionate, n-propyl formate, allyl formate, isopropyl acetate, methyl isobutyrate, sec-butyl formate, isobutyl formate, ethyl propionate, n-propyl acetate, methyl n-butyrate, allyl acetate, n-butyl formate, ethyl isobutyrate and beta-chloroethyl acetate.

Among the novel products produced by the process of this invention are dimethyl diallyl phosphonosuccinate.

The invention is illustrated by the following examples in which parts are given by weight and temperatures are in degrees centigrade, unless otherwise indicated.

EXAMPLE 1

To a 3-necked flask equipped with stirrer, reflux condenser, dropping funnel and reflux condenser were charged 172 parts of methyl acrylate and 120 parts of acetic acid. The mixture was heated to 70 degrees centigrade and 248 parts of trimethyl phosphite were added drop-wise over a 15 minute period. This mixture was heated with stirring at 75 to 80 degrees centigrade for an additional 1½ hours and was then transferred to a distillation flask and separated by distillation into two principal fractions. (1) 6.5 parts of material boiling at 55 to 60 degrees centigrade under atmospheric pressure and (2) 26.8 parts of material boiling at 90 to 98 degrees centigrade and 0.35 millimeter of mercury pressure. This second fraction had a refractive index $n_D^{20}$ of 1.4373. The literature shows the refractive index of trimethyl phosphonopropionate to be 1.4370, verifying that this is the product made.

EXAMPLE 2

Using the procedure of Example 1, 144 parts of dimethyl maleate and 66 parts of glacial acetic acid were charged to a reaction vessel. The mixture was heated, with stirring, to about 55 degrees centigrade and then 124 parts of trimethyl phosphite were added dropwise at a rate to keep the reaction temperature below 80 degrees centigrade. During the addition, a liquid started to distill from the reaction mixture. After the addition was completed, external heating was supplied until the distillation of low boiling materials ceased. A total yield of 51.6 parts of such materials was obtained. The reaction mixture was then fractionally distilled under reduced pressure after removal of the low boiling fraction. The main portion (203.5 parts) had a boiling point of 122 degrees centigrade at 0.25 millimeter of mercury pressure. This fraction was identified as tetramethyl phosphonosuccinate by comparison of its infrared spectrum with that of an authentic sample prepared by a prior art method.

*Analysis.* — Calculated for $C_8H_{15}O_7P$, Theory: P, 12.19%. Found: P, 12.14%.

EXAMPLE 3

Using the process of Example 1, 14.4 parts of dimethyl maleate and 20.2 parts of triallyl phosphite and 6.0 parts of glacial acetic acid were reacted. Four and three-tenths parts of allyl acetate were obtained and the compound was identified by its boiling point of 98 to 100 degrees centigrade and refractive index of $n_D^{20}$ of 1.4048. A second portion consisting of 19.9 parts of material having a boiling point of 144 to 148 degrees centrigrade at a vapor pressure of 0.18 millimeter of mercury was obtained. The infrared spectrum and phosphorus analysis of the product confirmed that it was dimethyl diallyl phosphonosuccinate. The infrared spectrum showed the following absorption peaks: 3.41, 5.75, 6.09, 6.96, 7.5, 7.94, 8.22, 8.61, 9.19, 9.3–10.1 and 11.63 microns. The recovery of 19.9 parts of dimethyl diallyl phosphonosuccinate represented a yield of 65 percent of the theoretical. The product is useful with or without styrene in preparing crosslinked castings and laminates.

*Analysis.* — Calculated for $C_{12}H_{19}O_7P$, Theory: P, 10.11%. Found: P, 9.94%.

EXAMPLE 4

A polypropylene glycol fumaric acid polyester resin was prepared by reacting 1160 parts of fumaric acid with 863 parts of propylene glycol at a temperature of about 220 degrees centrigrade for 5 hours. The resulting resin had an acid number of about 45 and was stabilized by the addition of 1 part of hydroquinone. The unsaturated polyester resin was used in preparing the phosphorus-containing compositions of Examples 5 and 6.

EXAMPLE 5

458 parts of the polypropylene fumaric polyester resin of Example 4 were dissolved in 300 parts of acetic acid. The resulting solution was heated to about 60 degrees centigrade and 186 parts of trimethyl phosphite were added drop-wise over a 15 minute period. During the addition, the temperature rose to about 100 degrees centigrade and this was maintained for a period of 4 hours. Methyl acetate (189 parts) was recovered as distillate from this heating period. Thereafter, the remainder of the methyl acetate, the excess acetic acid and any unreacted phosphites were removed by distillation at a temperature of about 95 degrees centrigrade and pressures as low as 0.5 millimeter of mercury. A yield of 576 parts of resin containing 7.06 percent of phosphorus was obtained. The resin contained ethylenic unsaturation and was capable of being copolymerized with styrene.

A solution of 100 parts of the above resin in 40 parts of styrene was prepared. The resulting resinous solution had a Gardner viscosity of Z. When catalyzed with one percent of benzoyl peroxide the styrenated solution cured to a hard (Barcol hardness 50) clear resin which was self-extinguishing upon removal from an open flame source. The styrenated resin was also used to form satisfactory laminates with glass cloth and/or glass mats when employed in usual polyester laminate techniques.

EXAMPLE 6

A portion (312 parts) of the polyester resin of Example 4 was dissolved in 180 parts of acetic acid and heated to 80 degrees centigrade. Drop-wise, 250 parts of tris(beta-chloroethyl) phosphite were added. The temperature was increased to 100 degrees centigrade during the addition of the phosphite and maintained there for an additional 4 hours. Then, the excess acetic acid, unreacted phosphite and chloroethyl acetate were distilled off, the final distillation condition being 95 degrees centigrade and pressure of 0.5 millimeter of mercury. The resulting resin contained 8.8 percent chlorine. The total yield of resin was approximately 500 parts. A solution of 100 parts of the resin and 40 parts of styrene had a Gardner viscosity of V–W.

EXAMPLE 7

A resin similar to the resin of Example 6 was prepared by reacting 793 parts of a polypropylene glycol fumarate resin, like that of Example 4, with 90 grams of acetic acid and reacting the product with 135 parts of tris(beta-chloromethyl) phosphate. The reaction mixture was heated for about 12 hours at 100 degrees centigrade and 835.5 parts of a phosphorus-containing polyester resin were obtained. The resulting resin was then dissolved in styrene in the ratio of 100 parts resin to 40 parts styrene. The product was then ready for fabrication into useful objects using conventional fabricating procedures for polyester resins.

EXAMPLE 8

A propylene glycol fumarate polyester resin like that of Example 4 (816 parts) was dissolved in 225 grams of acetic acid. The solution was heated to 75 degrees centigrade and 155 parts of trimethyl phosphite were added drop-wise over a period of 20 minutes. The temperature was then increased to 95 degrees centigrade and maintained there for approximately 4 hours. The excess acetic acid, unreacted phosphite and resulting methyl acetate were then distilled while maintaining the pot temperature below 100 degrees centigrade, the final pressure being about 0.5 millimeter of mercury. Approximately 893 parts of phosphorus-containing polyester resin were obtained. The resin was useful in preparing fire retardant polyester articles.

EXAMPLE 9

A linear butanediol maleate was prepared by mixing 495 parts of butanediol and 490 parts of maleic anhydride. The temperature was increased as rapidly as possible to 180 degrees centigrade and maintained for about 6½ hours. Thereafter, approximately 22.5 parts of butanediol were added and heating continued for 1½ hours after which another 22.5 parts of butanediol were added and the heating continued for an additional 3 hours. The resulting resin was cooled and discharged from the reaction vessel.

Approximately 142 parts of the above butanediol maleate polyester resin were dissolved in 142 grams of glacial acetic acid. Temperature was increased to about 80 degrees centigrade and 52 parts of trimethyl phosphite were added drop-wise over a 5 minute period. The reaction mixture was then maintained at a temperature of about 95 degrees centigrade for approximately 3 hours, during which time methyl acetate distilled from the mixture. The resulting phosphorus-containing resin was distilled under reduced pressure to obtain a resin that was clear, water white and essentially odorless. The product contained 6.73 percent of phosphorus and had an acid number of 77. The yield was 177 parts of resin. The phosphorus-containing resin was useful for conventional polyester fabrication techniques in producing useful fire retardant polyester resins.

EXAMPLE 10

A mixture of 100 parts of methyl methacrylate and 66 parts of acetic acid was charged to a 3-necked round bottom flask equipped with magnetic stirrer, distillation head, thermometer and dropping funnel. Then, 198 parts of diethyl phenylphosphonite were added drop-wise, with stirring. During the addition, the temperature increased to 40 degrees centigrade, after which heat was supplied to raise it to 80 degrees centigrade. The heating was continued for 4 hours after the phosphonite addition was complete. Distillation of the reaction product yielded 100 parts of a volatile portion which was mainly ethyl acetate, and 189 parts of a material boiling at 135 to 138 degrees centigrade at 38 millimeters of mercury pressure. The product had a refractive index of $n_D^{25}$ of 1.5040. The infrared spectrum of this fraction is consistent with that of ethyl phenyl-2-carbomethoxy propyl phosphinate.

*Analysis.*—Calculated for $C_{13}H_9O_4P$, Theory: P, 11.46%. Found: P, 11.5%.

EXAMPLE 11

A polyester resin prepared by heating 196 parts of maleic anhydride with 159.6 parts of propylene glycol at 200 to 210 degrees centigrade until an acid number of 35 was obtained. The resin was allowed to cool to 100 degrees centigrade and 360 parts of acetic acid were added. Trimethyl phosphite (248 parts) was added gradually, and the resin was heated to 120 degrees centigrade to remove the methyl acetate formed. About 239 parts of methyl acetate were collected. The resin was heated to 160 degrees centigrade under vacuum to remove excess acetic acid. The resulting resin had an acid number of 4.6 and a phosphorus content of 11 percent, which indicates that the resin was essentially free of ethylenic unsaturation.

Although certain preferred embodiments of the invention have been disclosed for the purpose of illustration, it will be evident that various changes and modifications may be made therein without departing from the scope and spirit of this invention.

What is claimed is:

1. A process for preparing a phosphonated polyester resin by reacting at an elevated temperature an ethylenically unsaturated polyester resin and a monocarboxylic acid free of ethylenic unsaturation and containing from 1 to about 18 carbon atoms, with a phosphorus compound having the formula $$(RO)_xP(R')_y$$

wherein R and R' contain from 1 to 12 carbon atoms and are independently selected from the group consisting of alkyl, alkylene, aralkyl and aryl, and halogenated derivatives thereof, provided that at least one R is alkyl, aralkyl or alkylene; $x$ is from 1 to 3, $y$ is from 0 to 2 and the sum of $x$ and $y$ is 3.

2. The process of claim 1 wherein the reaction is carried out at a temperature of about 20 to about 110 degrees centigrade.

3. The process of claim 1 wherein the monocarboxylic acid is acetic acid.

4. The process of claim 1 wherein the phosphorus compound is trimethyl phosphite.

5. The process of claim 1 wherein the phosphorus compound is diethyl phenyl phosphite.

6. A phosphonated polyester resin prepared by the process of claim 1.

7. The phosphonated polyester resin of claim 6 wherein the ethylenically unsaturated polyester resin is a polypropylene glycol fumarate polyester resin.

8. An article comprised of the phosphonated polyester resin of claim 6.

9. A process for preparing a phosphonated polyester resin by adding to an ethylenically unsaturated polyester resin a monocarboxylic acid free of ethylenic unsaturation and containing 1 to about 18 carbon atoms, heating the resultant acid-polyester mixture, reacting a phosphorus compound having the formula $$(RO)_xP(R')_y$$

wherein R and R' contain from 1 to 12 carbon atoms and are independently selected from the group consisting of alkyl, alkylene, aralkyl and aryl, and halogenated derivatives thereof, provided that at least one R is alkyl, aralkyl or alkylene; $x$ is from 1 to 3, $y$ is from 0 to 2 and the sum of $x$ and $y$ is 3; with the heated acid-polyester mixture, and recovering the resulting phosphonated resin from the resulting ester of said monocarboxylic acid.

10. A process for preparing a phosphonated polyester resin by adding to an ethylenically unsaturated polyester resin a monocarboxylic acid free of ethylenic unsaturation and containing 1 to about 18 carbon atoms, heating the acid-resin mixture to a temperature of about 20 to about 110 degrees centigrade, reacting the heated acid-resin mixture with a phosphite containing 3 to 36 carbon atoms, and recovering the resulting phosphonated resin from the resulting ester of said monocarboxylic acid.

References Cited

FOREIGN PATENTS

| | | |
|---|---|---|
| 601,309 | 7/1960 | Canada. |
| 1,122,252 | 7/1959 | Germany. |
| 893,674 | 4/1962 | Great Britain. |

OTHER REFERENCES

Polyesters and Their Applications, Bjorksten et al., copyright 1956, pp. 160 and 161.

WILLIAM H. SHORT, *Primary Examiner.*

R. T. LYON, *Assistant Examiner.*